United States Patent
Godthi et al.

(10) Patent No.: US 9,721,051 B2
(45) Date of Patent: Aug. 1, 2017

(54) REDUCING CLOCK SKEW IN SYNTHESIZED MODULES

(71) Applicant: Oracle International Corporation, Redwood Shores, CA (US)

(72) Inventors: Mamata Godthi, San Jose, CA (US); Chandan Shantharaj, San Jose, CA (US); Claire Shih, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

(21) Appl. No.: 14/810,887

(22) Filed: Jul. 28, 2015

(65) Prior Publication Data

US 2017/0032059 A1   Feb. 2, 2017

(51) Int. Cl.
*G06F 17/50* (2006.01)

(52) U.S. Cl.
CPC .................. *G06F 17/505* (2013.01)

(58) Field of Classification Search
CPC ....................................................... G06F 17/50
USPC ...................................................... 716/103
See application file for complete search history.

(56) References Cited

U.S. PATENT DOCUMENTS

2006/0015313 A1\* 1/2006 Wang .................. G06F 17/5027
                                                              703/14

OTHER PUBLICATIONS

Tao Ye, T. et al., "Data Path Placement with Regularity", 2000 IEEE/ACM International Conference on, Nov. 5-9, 2000, pp. 264-270 (7 pages).
Microsemi, Application Note AC373, "Source-Synchronous Clock Designs: Timing Constraints and Analysis", Aug. 2011, www.microsemi.com (12 pages).
Eik Wee, C. et al., "Nano-scale VLSI Clock Routing Module based on Useful-Skew Tree Algorithm", Regional Postgraduate Conference on Engineering and Science (RPCES 2006), Johore, Jul. 26-27, 2006 (5 pages).

\* cited by examiner

*Primary Examiner* — Thuan Do
(74) *Attorney, Agent, or Firm* — Osha Liang LLP

(57) ABSTRACT

A method for designing an integrated circuit. The method may include obtaining a register-transfer level (RTL) file for the integrated circuit. The RTL file may include hardware description language code that describes various modules for the integrated circuit. The method may further include selecting, within the RTL file, various state elements having a predetermined clock skew. The method may further include associating, in response to selecting the state elements, the state elements with a predetermined clock header. The method may further include generating a gate-level netlist using the RTL file. The state elements may be assigned to the predetermined clock header in the gate-level netlist. The method may further include generating, using the gate-level netlist, a clock network for the integrated circuit. The state elements in the clock network may have the predetermined clock skew.

20 Claims, 6 Drawing Sheets

REDUCING CLOCK SKEW IN SYNTHESIZED MODULES

BACKGROUND

Microelectronic circuits may consist of many million transistors and other electronic elements as a direct result of ever decreasing feature size and added circuit functionality. Specifically, microelectronic circuits may be designed using a hardware description language (HDL), such as the VHSIC hardware description language (VHDL) or Verilog, to model the microelectronic circuits. As such, there are many challenges related to the microelectronic circuit design that are included in both the physical design and verification of the physical design.

SUMMARY

In general, in one aspect, embodiments relate to a method for designing an integrated circuit. The method includes obtaining a register-transfer level (RTL) file for the integrated circuit. The RTL file includes hardware description language code that describes various modules for the integrated circuit. The method further includes selecting, within the RTL file, various state elements having a predetermined clock skew. The method further includes associating, in response to selecting the state elements, the state elements with a predetermined clock header. The method further includes generating a gate-level netlist using the RTL file. The state elements are assigned to the predetermined clock header in the gate-level netlist. The method further includes generating, using the gate-level netlist, a clock network for the integrated circuit. The state elements in the clock network have the predetermined clock skew.

In general, in one aspect, embodiments relate to a system for designing an integrated circuit. The system includes a computer processor, a register-transfer level (RTL) file for the integrated circuit, and a memory. The RTL file includes hardware description language code that describes various modules for the integrated circuit. The system further includes a netlist generator module, executable on the computer processor, and configured to select, within the RTL file, various state elements having a predetermined clock skew. The netlist generator module is further configured to associate, in response to selecting the plurality of state elements, the state elements with a predetermined clock header in the gate-level netlist. The netlist generator module is further configured to generate a gate-level netlist using the RTL file. The state elements are assigned to the predetermined clock header in the gate-level netlist. The system further includes a clock network module, executable on the computer processor, and configured to generate, using the gate-level netlist, a clock network for the integrated circuit. The state elements in the clock network have the predetermined clock skew.

In general, in one aspect, embodiments relate to a non-transitory computer readable medium (CRM) storing various instructions for designing an integrated circuit. The instructions include functionality for obtaining a register-transfer level (RTL) file for the integrated circuit. The RTL file includes hardware description language code that describes various modules for the integrated circuit. The instructions further include functionality for selecting, within the RTL file, various state elements having a predetermined clock skew. The instructions further include functionality for associating, in response to selecting the state elements, the state elements with a predetermined clock header. The instructions further include functionality for generating a gate-level netlist using the RTL file. The state elements are assigned to the predetermined clock header in the gate-level netlist. The instructions further include functionality for generating, using the gate-level netlist, a clock network for the integrated circuit. The state elements in the clock network have the predetermined clock skew.

Other aspects of the invention will be apparent from the following description and the appended claims.

DETAILED DESCRIPTION

Figure 1:
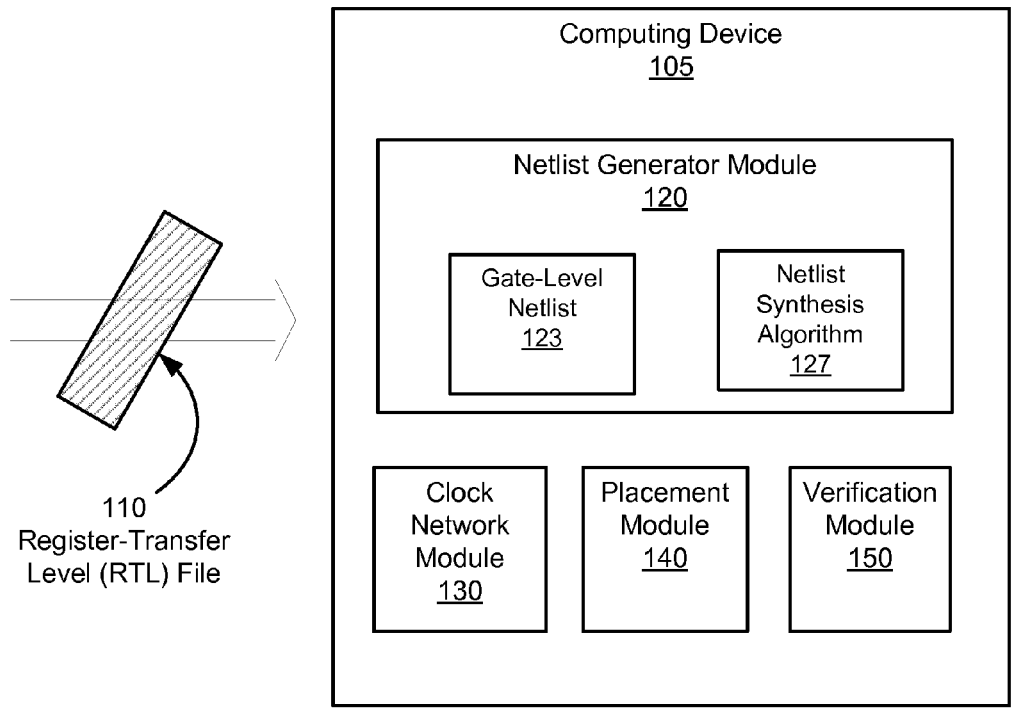
FIG. 1 shows a system in accordance with one or more embodiments.
Figure 1:
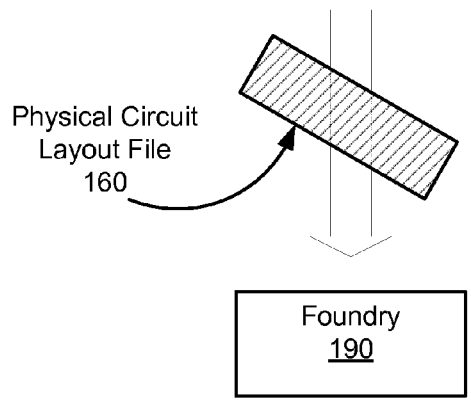

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a method, a system, and a non-transitory computer readable medium for designing an integrated circuit. In particular, one or more embodiments are directed to selecting a group of state elements for a particular clock header within a register-transfer level (RTL) file. The group of state elements may be for a timing critical path within an integrated circuit, for example. Accordingly, the group of state elements may be associated with the clock header in the RTL file and a gate-level netlist may generated from the RTL file that has the group of state elements assigned to the clock header. When a clock network is generated based on the gate-level netlist, the group of state elements may have a related clock skew, e.g. that satisfies timing requirements of the timing critical path.

FIG. 1 shows a system in accordance with one or more embodiments. As shown in FIG. 1, the system may include a computing device (105) and a foundry (190). In one or more embodiments, the computing device (105) includes various modules, such as a netlist generator module (120), a clock network module (130), a physical placement module (140), and/or a verification module (150). The modules may be a combination of hardware and/or software within the computing device. Furthermore, the modules may not be distinct hardware and/or software, and various functionality performed by the computing device (105) may encompass one or more of the modules. The foundry (190) may be a semiconductor fabrication plant that is configured to manufacture a physical integrated circuit with the specifications in a particular physical circuit layout.

Figure 6:
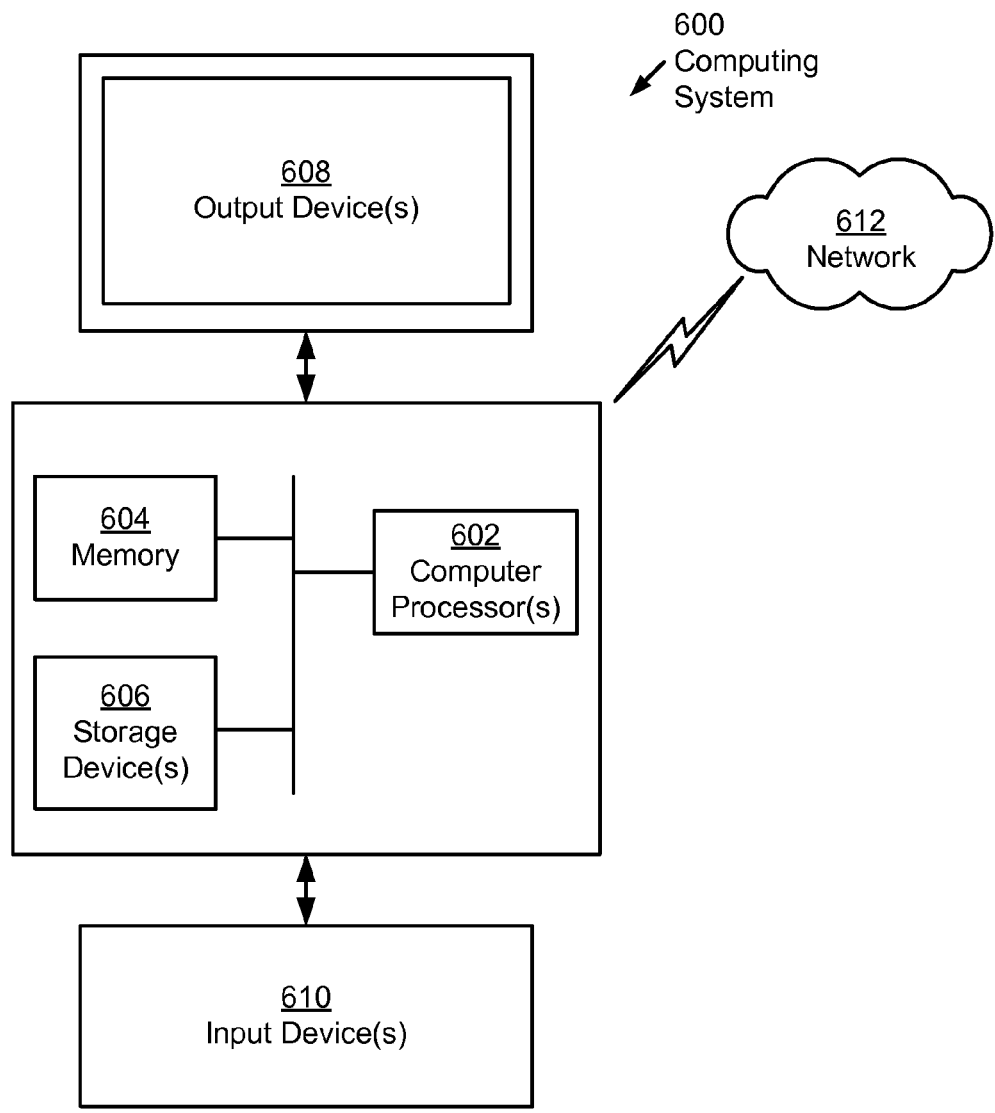
FIG. 6 shows a computing system in accordance with one or more embodiments.

As such, the computing device (105) is configured to obtain a register-transfer level (RTL) file (110) for one or more integrated circuits and determine one or more physical layouts of the one or more integrated circuits (e.g., physical circuit layout file (160)). As shown, the RTL file (110) may be received from a third party, but the RTL file (110) may also be generated on the computing device (105). The computing device (105) may be implemented on the same or different specialized computer systems of the type found and described in relation to FIG. 6.

In one or more embodiments, the RTL file (110) defines a high-level representation of a portion of an integrated circuit. For example, the RTL file (110) may be a software file in a hardware description language, such as Verilog or very high speed integrated circuit (VHSIC) hardware description language (VHDL). In particular, code in the RTL file (110) may describe a logical implementation of various digital and/or analog signals communicated between various circuit modules within an integrated circuit. Specifically, the logical implementation may correspond to a specific design architecture having various design specifications. For example, the design architecture may be for an application specific integrated circuit (ASIC), and the design architecture may define particular mechanisms and/or structures in the ASIC to perform various digital logic. Thus, the digital logic may include, for example, various electrical inputs to the ASIC and/or various electrical outputs from the ASIC. Furthermore, the code in the RTL file (110) may include a modular design that produces the electrical outputs in response to the electrical inputs.

With respect to using a modular design, the RTL file (110) may divide the logical implementation of an integrated circuit into various circuit modules. In particular, the circuit modules may include datapath blocks, memory blocks, and control blocks. For example, a datapath block may direct the flow of input data signals throughout the integrated circuit. As such, a datapath block may be a state machine configured for various data processing operations along a datapath through the integrated circuit. Control block may be a state machine configured to manage the datapath blocks through various control inputs based on desired functions and output signals. In contrast, a memory block may be configured to store data values without changing state.

In one or more embodiments, the circuit modules in the RTL file (110) include one or more synthesized modules. In particular, a synthesized module may not have a defined set of circuit components for implementing various circuit logic specifications described in the RTL file (110). Thus, if a physical circuit requires various circuit components to perform a particular logic function, the RTL file (110) may merely describe the logical function performed by the circuit components without specifying details regarding the circuit components. As such, the actual components of the synthesized module may be selected when generating the gate-level netlist (123). For example, a control block may be a synthesized module.

Specifically, circuit components in an integrated circuit may include various state elements configured to change a state based on an input from a clock signal. For example, a state element may be a flip-flop that includes a source flop and a sink flop. Thus, a data signal may travel along a data path from the source flop to the sink flop. Specifically, flip-flops may change state in response to a clock signal (i.e., edge-triggered). A state element may be a discrete circuit that is configured to store and output state information, e.g., the state element may be in an "on" state that outputs one value or an "off" state that outputs a different value.

Keeping with FIG. 1, the netlist generator module (120) may produce a gate-level netlist (123) from the RTL file (110). Specifically, the gate-level netlist (123) may include a list of terminal identifiers (i.e., gates) that map the connections of various circuit components, such as state elements, clocks, etc., within an integrated circuit. The gate-level netlist (123) may include connectivity information, such as propagation delays between circuit components as well as various other circuit attributes. In producing the gate-level netlist (123), the netlist generator module (120) may use the logical implementation in the RTL file (110) to map the terminals of one state element, e.g., a source side of a flip-flop, to the gate of another state element, e.g., a sink side of the flip-flop.

In one or more embodiments, the netlist generator module (120) uses a netlist synthesis algorithm (127) to determine various terminal connections for a gate-level netlist (123). Thus, for example, when various circuit components are needed to produce the logical specifications for a synthesized module, the circuit components may be randomly or pseudorandomly synthesized by the netlist synthesis algorithm (127) for insertion into the gate-level netlist (123). As such, the netlist synthesis algorithm (127) may generate the circuit components as needed and connect them to various existing circuit components.

In one or more embodiments, the clock network module (130) is configured to generate a clock network for the gate-level netlist (127). In one or more embodiments, the clock network module (130) performs a clock tree synthesis to produce a clock network having signal paths connecting a clock source, e.g., a clock header, and state elements in the gate-level netlist (127). For example, the clock network may include various clock headers and buffer headers with various signal paths between the clock headers, the buffer headers, and the state elements. To perform the clock tree synthesis, the clock network module (130) may generate and place buffer headers between a clock input signal from a particular clock header (e.g., the source of the clock signal) and a corresponding clock pin on a particular state element. A buffer header may act to delay a particular clock input signal from reaching the particular state device to provide a specific hold time or set up time for the integrated circuit.

Figure 2:
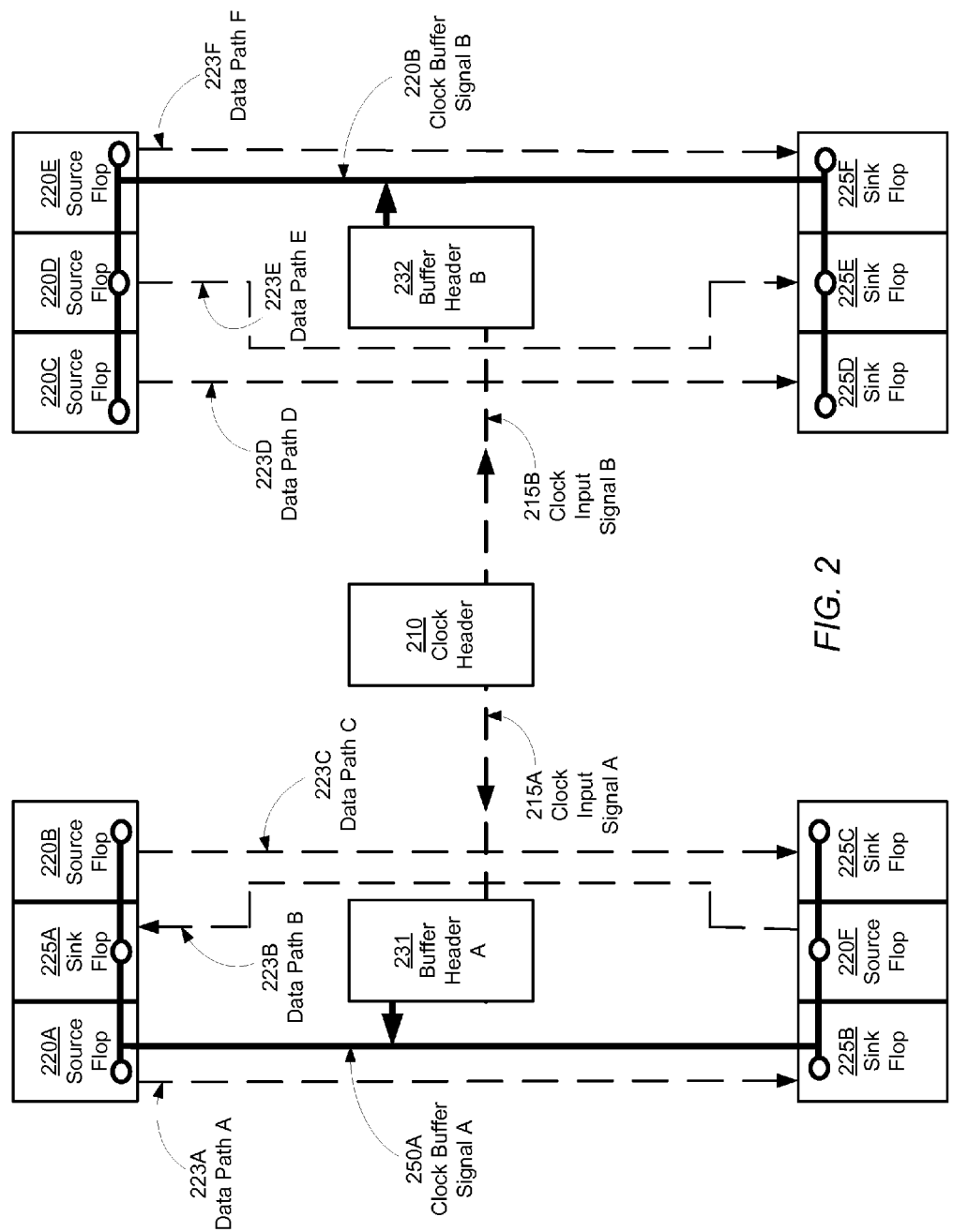
FIG. 2 shows a system in accordance with one or more embodiments.

Turning to FIG. 2, FIG. 2 illustrates a clock network in accordance with one or more embodiments. As shown, FIG. 2 includes a clock header (210) with various buffer headers (e.g., buffer head A (231), buffer header B (232)) that are connected to various state elements (e.g., source flops (220A, 220B, 220C, 220D, 220E, and 220F) and sink flops (225A, 225B, 225C, 225D, 225E, and 225F)). The clock header (210) may provide the source of various clock input signals (215A, 215B) for transmission to the buffer headers (231, 232). In turn, the buffer headers (231, 232) may distribute the clock buffer signals (250A, 250B) to respective groups of state elements. Thus, the clock signals (215A, 215B, 250A, 250B) of the clock network in FIG. 2 may operate alongside various data paths (223A, 223B, 223C, 223D, 223E, and 223F) for transmitting data values between the state elements.

The clock network as shown in FIG. 2 may have a predetermined clock skew. Specifically, the clock skew may be the difference between the shortest and longest clock network delay between state elements in an integrated circuit or a portion of the integrated circuit. For example, various state elements within the integrated circuit may have the shortest clock network delay, the longest clock network delay, or have a delay that falls in the range between the two extremes. Furthermore, a global clock skew may be the difference between the shortest clock network delay between any two cells (e.g., two state elements) in an integrated circuit and the longest clock network delay between any two cells in the same integrated circuit. In other words, a particular integrated circuit may have a specified global clock skew. As such, the clock skew of the clock network may determine an amount of functionality performed by the corresponding integrated circuit within a particular clock cycle.

Returning to FIG. 1, in one or more embodiments, the placement module (140) is configured to generate a physical circuit layout file (160) for an integrated circuit. For example, the physical circuit layout file may be a software file that describes a set of polygons representing the layout of an integrated circuit. Specifically, the placement module (140) may determine the physical location of various circuit components on a semiconductor die, such as through floor planning, determining the placement of circuit components, and routing between the circuit components in a physical circuit layout. In one or more embodiments, the physical circuit layout file (160) may include mask data configured to be used by a photomask writer. Thus, the photomask writer may produce a physical mask for the integrated circuit based on the mask data.

In one or more embodiments, the verification module (140) may perform various simulations to measure the performance of the gate-level netlist (123) and/or the physical circuit layout of an integrated circuit. For example, a circuit simulator may model an integrated circuit corresponding to the physical circuit layout file (190). In particular, timing performance of components within the integrated circuit as well as whether any design specifications associated with a desired architecture may be determined by the verification module (140) as being satisfied or unsatisfied through a simulation of the integrated circuit. In one or more embodiments, for example, a timing path is simulated for whether the state elements within the timing path satisfy a specified clock skew.

Figure 3:
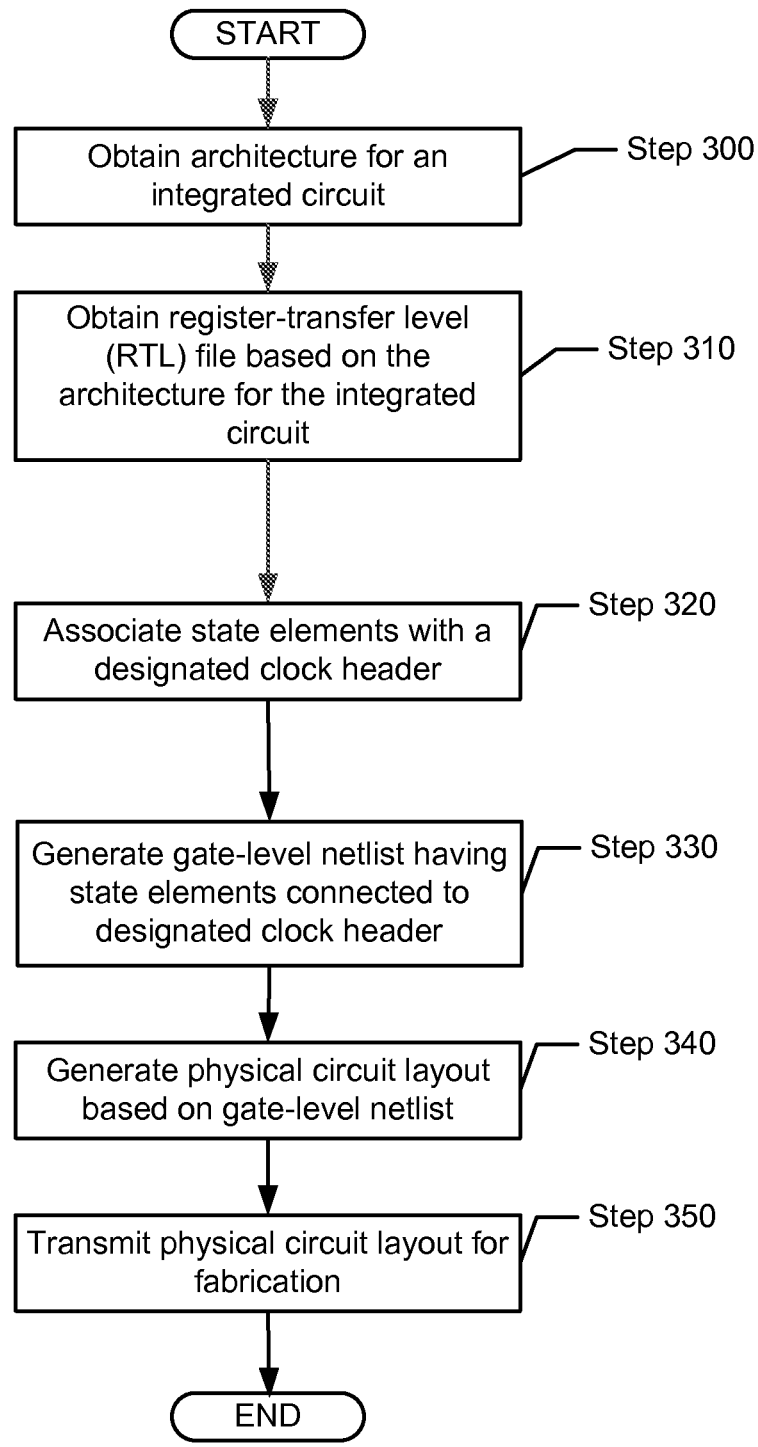
FIGS. 3-5 show flowcharts in accordance with one or more embodiments.
Figure 4:
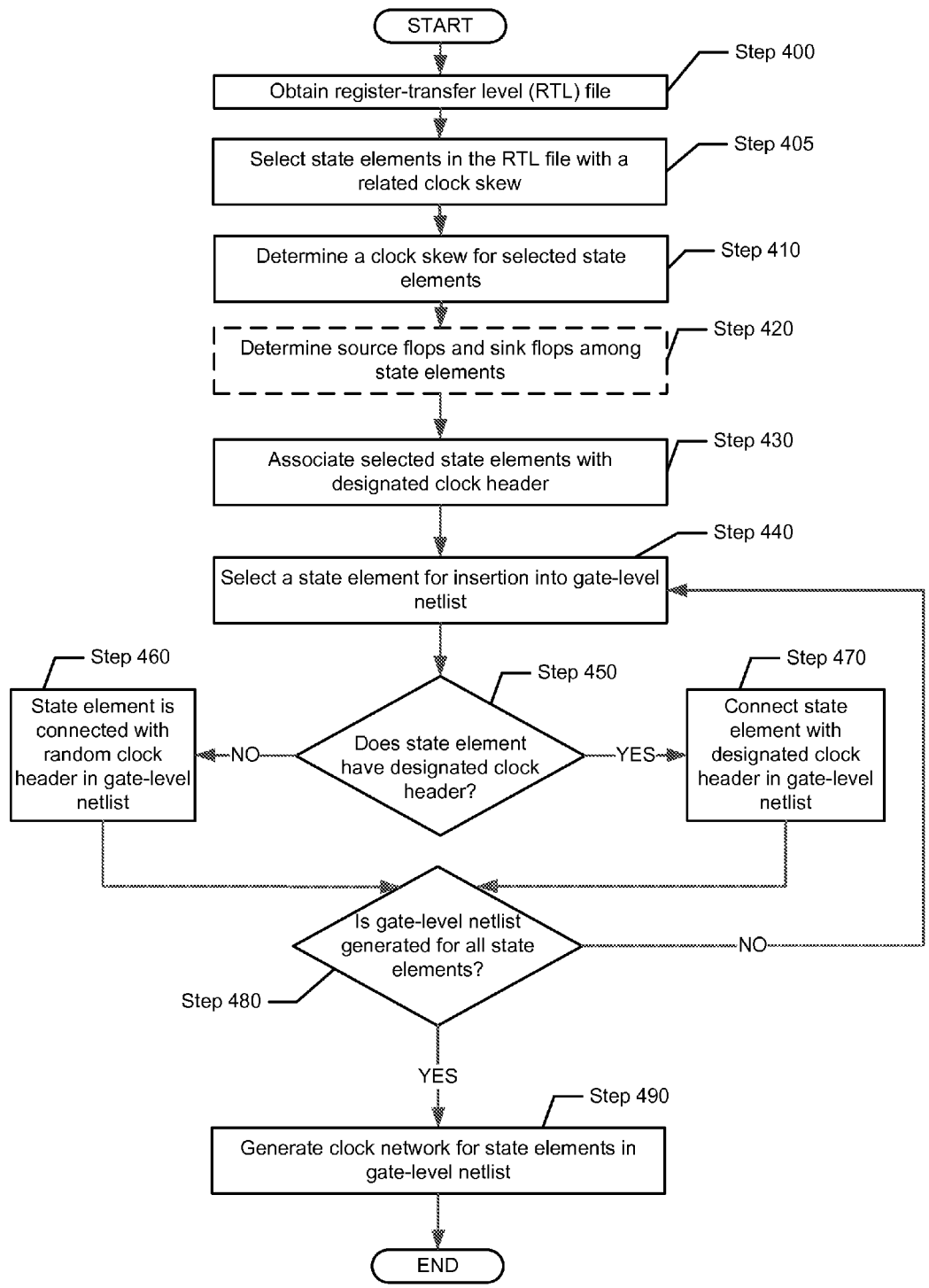
Figure 5:
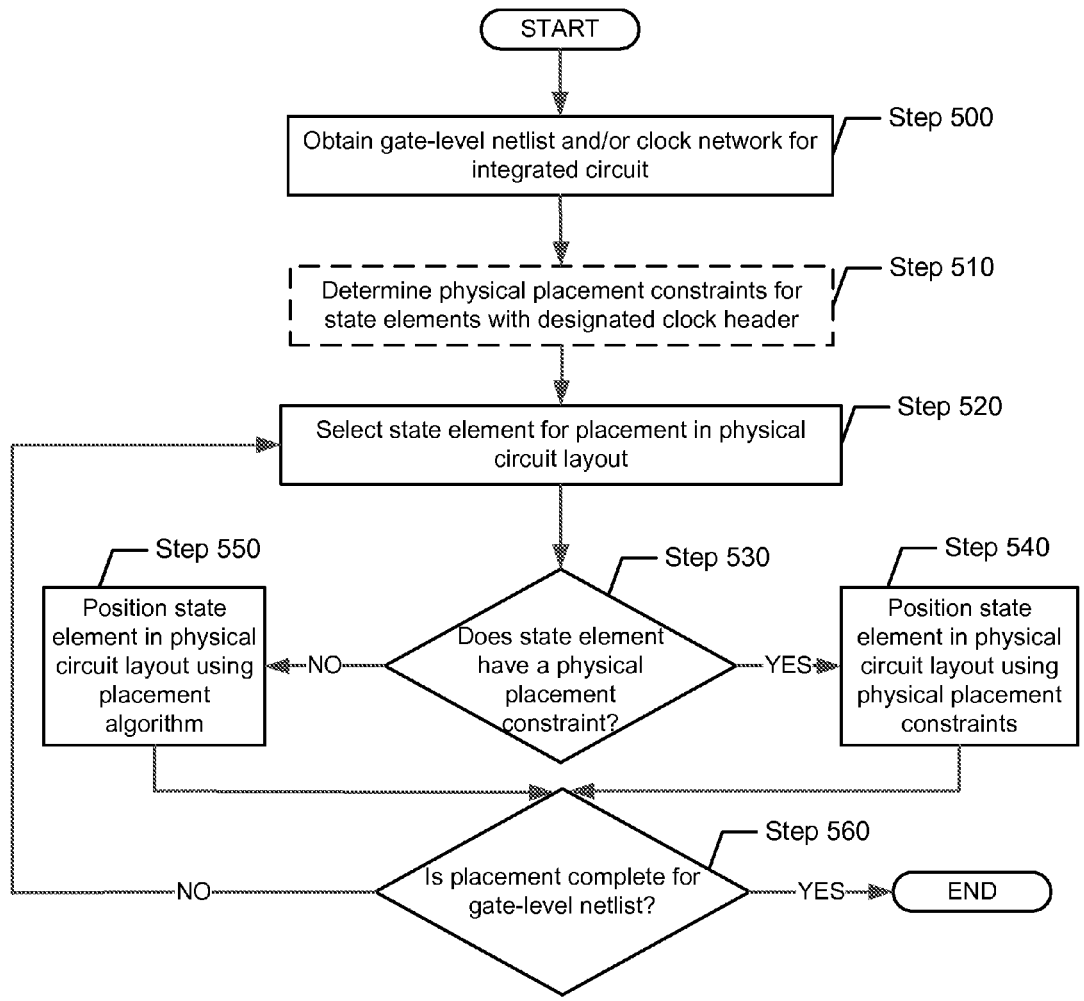

FIGS. 3, 4, and 5 show flowcharts in accordance with one or more embodiments. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

FIG. 3 shows a method for designing an integrated circuit in accordance with one or more embodiments. Specifically, the process depicted in FIG. 3 may be performed by a computing device as described in FIG. 1 and/or the computing system as described in FIG. 6.

In Step 300, architecture is obtained for an integrated circuit in accordance with one or more embodiments. For example, various design specifications describing the architecture may be retrieved from a particular client, e.g., a hardware manufacturer. The architecture may describe the general functionality of the integrated circuit, such as various inputs and respective outputs as produced by the integrated circuits. The architecture may also include various physical requirements such as the physical dimensions of the integrated circuits as well as various manufacturing requirements (e.g., material types, component types, etc.).

In Step 310, a register-transfer level (RTL) file is obtained based on architecture for the received architecture for the integrated circuit in accordance with one or more embodiments. The RTL file may be generated on a computing device by a user, or obtained from an outside party.

In Step 320, various state elements are associated with a designated clock header in accordance with one or more embodiments. In particular, a group of state elements may be designated in an RTL file as receiving their respective clock signals from a common clock header or clock buffer in a gate-level netlist. For example, a user may modify code in the RTL with user-attributes for a state element with clock information describing the source of a clock signal. The clock information may identify a designated clock header or a designated buffer connected to the clock header. In one or more embodiments, the attribute information may group various state elements as having a common source of a clock signal.

In Step 330, a gate-level netlist is generated with state elements connected to a designated clock header in accordance with one or more embodiments. The gate-level netlist may be generated using various netlist synthesis algorithms for compiling RTL code to produce a gate-level netlist. In one or more embodiments, a netlist synthesis algorithm determines whether a state element in an RTL file has a designated clock header and/or buffer header and assigns the state element within the gate-level netlist accordingly.

In Step 340, a physical circuit layout is generated based on the gate-level netlist in accordance with one or more embodiments. In one or more embodiments, for example, a floorplan of a particular chip is generated using the gate-level netlist. Regions of integrated circuit die may be partitioned off to produce the floorplan. Thus, gates in the gate-level netlist may be assigned to various locations, e.g., specific areas on the integrated circuit die. The physical circuit layout may include wire placement for a clock tree and/or routing for various data paths between gates of the physical circuit components.

In one or more embodiments, generating the physical circuit layout includes various optimization processes, such as physical verification of the integrated circuit. The physical verification of the integrated circuit may include determining whether the design logic in the RTL code was mapped accurately and whether any manufacturing rules are violated by the physical circuit layout.

In Step 350, the physical circuit layout is transmitted for fabrication in accordance with one or more embodiments. Thus, the physical circuit layout may be a physical circuit layout file that is transmitted to an entity, such as a foundry, for manufacturing the integrated circuit. In one or more embodiments, the physical layout may be provided to a foundry (e.g., foundry (190)) configured for fabricating the respective integrated circuit.

FIG. 4 shows a method for designing an integrated circuit in accordance with one or more embodiments. Specifically, the process depicted in FIG. 4 may be performed by a computing device as described in FIG. 1 and/or the computing system as described in FIG. 6. In Step 400, a register-transfer level (RTL) file is obtained in accordance with one or more embodiments. The RTL file may describe the circuit logic implementing a specific integrated circuit architecture.

In Step 405, various state elements are selected in an RTL file with a related clock skew in accordance with one or more embodiments. In one or more embodiments, for example, a user may identify several state elements in an RTL file along a particular timing path that includes various timing specifications. In one or more embodiments, the selection of the state elements may be performed by designating a module or state elements for the module with various user-defined attributes, such as specific timing attributes specifying a particular clock skew for state elements within the module.

In Step 410, a clock skew is selected for the state elements in accordance with one or more embodiments. In particular, the RTL file may include various clock parameters that specify an absolute value for the clock skew, a minimum clock skew, a maximum clock skew, and/or a range of values that the clock skew may be in a gate-level netlist based on the RTL file. In one or more embodiments, these clock parameters are specified using various user attributes within the RTL file. In one or more embodiments, the clock parameters are implemented using a separate software program, e.g., a software program that generates a gate-level netlist based on the RTL file. In one or more embodiments, the state elements are selected in Step 405 such that the clock network delay for any of the elements satisfies the clock skew selected in Step 410. Thus, a timing critical path having the state elements selected in Step 410 may require a particular clock skew that is selected in Step 410.

In Step 420, various source flops and sink flops are determined among state elements in accordance with one or more embodiments. For example, state elements may be part of a synchronous system made up of a source flop and a sink flop. As such, in the RTL file, one state element may be designated as a source flop outputting data to a second state element being the sink flop.

In Step 430, state elements are associated with a designated clock header in accordance with one or more embodiments. For example, the selected state elements from Step 405 may be assigned in the RTL file a specific clock instance, such as a clock header or a particular buffer header for the clock header. Thus, the association in Step 430 may be define the specific clock header for the state elements. In one or more embodiments, a group of state elements is defined in the RTL file as having a shared clock instance. In one or more embodiments, the association in Step 430 is produced according to various clock parameters from Step 410. Accordingly, a netlist synthesis algorithm may assign each member of the group of state elements to a particular clock header during a gate-level netlist synthesis.

Steps 440-480 may describe a synthesis process for generating a gate-level netlist from the register-transfer level file prepared in Steps 400-430. As shown, hardware description language code in an RTL file may be compiled to produce a gate-level netlist that maps various gates within an integrated circuit.

In Step 440, a state element is selected for insertion into a gate-level netlist in accordance with one or more embodiments. For example, various state elements along with other modules may be selected in an iterative manner for generating the synthesized gate-level netlist. As such, various netlist synthesis algorithms may be performed for compiling the hardware description language code from the RTL file.

In Step 450, a determination is made whether the state element has a designated clock header in accordance with one or more embodiments. In one or more embodiments, for example, a netlist synthesis algorithm may determine whether a state element has an attribute in the RTL file for a specific clock header. If no such attribute exists, then a determination may be made that any clock header within the gate-level netlist can be used. When it is determined that the state element has a designated clock header, the process proceeds to Step 470. When it is determined that the state element has no designated clock header, the process proceeds to Step 460.

In Step 460, a state element is connected with a random clock header in the gate-level netlist in accordance with one or more embodiments. The random clock header may be selected randomly or pseudorandomly. As such, without a designated clock header, the netlist synthesis algorithm may map the state element to any buffer header and/or clock header as specified by one or more other constraints within the netlist synthesis algorithm, or in an arbitrary fashion.

In Step 470, a state element is connected with a designated clock header in accordance with one or more embodiments. For example, if the state element is associated with a designated clock header in Step 430, the netlist synthesis algorithm may generate the designated clock header in the gate-level netlist. Once the designated clock header is already generated, later state elements associated with the same designated clock header may be connected subsequently in Step 470. While the state element may be connected directly to the designated clock header, the state element may also be connected to a buffer header for the designated clock header.

In Step 480, a determination is made whether the gate-level netlist is generated for all state elements in accordance with one or more embodiments. If any state elements remain in the RTL file prepared in Steps 400-430, the process proceeds to Step 440. If synthesis of the gate-level netlist is complete, the process proceeds to Step 490.

In Step 490, a clock network is generated for state elements in the gate-level netlist in accordance with one or more embodiments. In generating the clock network, timing paths may be generated between clock headers, buffer headers, and state elements within the gate-level netlist from Step 480. For example, random or pseudorandom buffer headers may be placed throughout the clock network. As such, the buffer headers may delay a particular clock signal from reaching the particular state device to provide a specific hold time or set up time for the integrated circuit.

FIG. 5 shows a method for designing an integrated circuit in accordance with one or more embodiments. Specifically, the process depicted in FIG. 5 may be performed by a computing device as described in FIG. 1 and/or the computing system as described in FIG. 6.

In Step 500, a gate-level netlist and/or a clock network are obtained for an integrated circuit in accordance with one or more embodiments. For example, the gate-level netlist in Step 500 may be the gate-level netlist produced in FIG. 4 while the clock network in Step 500 may the clock network produced in Step 490.

In Step 510, various physical placement constraints are determined for state elements with designated clock header in accordance with one or more embodiments. For example, a placement file may be included with the gate-level netlist that specifies the location of state elements and headers in the integrated circuit. As such, the state elements may be placed in close proximity to the designated clock header and/or buffer headers to achieve a particular clock specification, such as the clock skew determined in Step 410 above.

Steps 520-560 may describe a synthesis process for generating a physical circuit layout for the integrated circuit. Specifically, Steps 520-560 may include floor planning, placement of circuit components, and routing between the circuit components in the physical circuit layout. For example, the size of a chip may be estimated, input/output pins on the chip may be assigned, and power planning may be performed.

In Step 520, a state element is selected for placement in physical circuit layout in accordance with one or more embodiments. For example, various state elements along with other circuit components may be selected in an iterative manner for generating the physical circuit layout.

In Step 530, a determination is made whether a state element has a physical placement constraint in accordance with one or more embodiments. In one or more embodiments, a placement file for the gate-level netlist from Step 500 is examined for whether the particular state element has any physical placement constraints. When it is determined that the state element has a physical placement constraint, the process proceeds to Step 540. When it is determined that the state element has no physical placement constraints, the process proceeds to Step 550.

In Step 540, state element is positioned in physical circuit layout using various placement constraints in accordance with one or more embodiments. As such, a placement algorithm may determine the physical location of the state element as to obey the physical placement constraints of the state element selected in Step 520 or any physical placement constraints of any other state elements already placed in the physical circuit layout.

In Step 550, state element is positioned in physical circuit layout using placement algorithm in accordance with one or more embodiments. For example, the placement algorithm may place components randomly or pseudorandomly throughout the physical circuit layout. The placement algorithm may also use various other parameters for various layout optimization processes, such as to efficiently use space within a printed circuit board.

In Step 560, a determination is made whether placement is complete for gate-level netlist in accordance with one or more embodiments. When all state elements and other circuit components have been placed in a physical circuit layout, the process proceeds to end. When it is determined that there are state elements that have not been placed within the physical circuit layout, the process proceeds to Step 520.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Additionally, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for designing an integrated circuit, comprising:

obtaining, using a computer processor, a register-transfer level (RTL) file comprising a first plurality of state elements and a second plurality of state elements for the integrated circuit, wherein the RTL file comprises hardware description language code that describes a plurality of circuit modules for the integrated circuit, and wherein the first plurality of state elements and the second plurality of state elements are circuit components configured to change states in response to a clock signal;

obtaining, using the computer processor and within the RTL file, a selection of the first plurality of state elements for a predetermined clock skew;

associating, using the computer processor and within the RTL file and in response to obtaining the selection of the first plurality of state elements, the first plurality of state elements with a predetermined clock header;

generating, using the computer processor, a gate-level netlist using the RTL file, wherein the first plurality of state elements are assigned to the predetermined clock header in the gate-level netlist, and wherein the second plurality of state elements are assigned to one or more random clock headers in the gate-level netlist using a netlist synthesis algorithm; and generating, using the computer processor and the gate-level netlist, a clock network for the integrated circuit, wherein the first plurality of state elements in the clock network have the predetermined clock skew.

2. The method of claim 1, wherein associating the first plurality of state elements with the predetermined clock header comprises assigning the first plurality of state elements to the predetermined clock header using user-defined attributes within the RTL file.

3. The method of claim 1,
wherein associating the first plurality of state elements with the predetermined clock header comprises assigning the first plurality of state elements to a predetermined group, and
wherein generating the gate-level netlist comprises generating the predetermined clock header in the gate-level netlist having each state element in the predetermined group connected to the predetermined clock header.

4. The method of claim 1, further comprising:
generating a physical circuit layout file for the integrated circuit based on the gate-level netlist and the clock network,
wherein the physical circuit layout files comprises a plurality of locations on a semiconductor die for the first plurality of state elements, the second plurality of state elements, and the clock network.

5. The method of claim 4, further comprising:
transmitting the physical circuit layout file to a user device, wherein the physical circuit layout file comprises mask data for fabricating the integrated circuit.

6. The method of claim 1,
wherein generating the clock network comprising generating a clock buffer in the clock network, and
wherein the first plurality of state elements are configured to receive a clock buffer signal from the predetermined clock header through the clock buffer.

7. The method of claim 1, further comprising:
determining whether a respective state element within the RTL file is associated with the predetermined clock header;
when the respective state element is associated with the predetermined clock header, connecting the respective state element with the predetermined clock header in the gate-level netlist; and
when the respective state element is not associated with the predetermined clock header, connecting the respective state element to a pseudorandomly generated clock header using the netlist synthesis algorithm.

8. The method of claim 7,
wherein the netlist synthesis algorithm generates a plurality of clock headers, and
wherein the netlist synthesis algorithm assigns a predetermined state element of the second plurality of state elements to a respective clock header of the plurality of clock headers.

9. The method of claim 1,
wherein the predetermined clock skew comprises a maximum arrival time of a clock input signal between the two or more state elements within a clock cycle.

10. The method of claim 1,
wherein the plurality of circuit modules comprises a synthesized module, and
wherein the first plurality of state elements are part of the synthesized module.

11. A system for designing an integrated circuit, comprising:
a computer processor;
a register-transfer level (RTL) file comprising a first plurality of state elements and a second plurality of state elements for the integrated circuit, wherein the RTL file comprises hardware description language code that describes a plurality of circuit modules for the integrated circuit, and wherein the first plurality of state elements and the second plurality of state elements are circuit components configured to change states in response to a clock signal;
a memory executable by the computer processor, the memory configured to:
obtain, within the RTL file, a selection of the first plurality of state elements for a predetermined clock skew;
associate, in response to obtaining the selection of the first plurality of state elements, the first plurality of state elements with a predetermined clock header;
generate a gate-level netlist using the RTL file, wherein the first plurality of state elements are assigned to the predetermined clock header in the gate-level netlist, and wherein the second plurality of state elements are assigned to one or more random clock headers in the gate-level netlist using a netlist synthesis algorithm; and
generate, using the gate-level netlist, a clock network for the integrated circuit, wherein the first plurality of state elements in the clock network have the predetermined clock skew.

12. The system of claim 11, wherein the memory is further configured to:
generate a physical circuit layout file for the integrated circuit based on the gate-level netlist and the clock network,
wherein the physical circuit layout file comprises a plurality of locations on a semiconductor die for the first plurality of state elements, the second plurality of state elements, and the clock network.

13. The system of claim 11, wherein associating the first plurality of state elements with the predetermined clock header comprises assigning the first plurality of state elements to the predetermined clock header using user-defined attributes within the RTL file.

14. The system of claim 11,
wherein the plurality of circuit modules comprises a synthesized module, and
wherein the first plurality of state elements are part of the synthesized module.

15. A non-transitory computer readable medium (CRM) storing instructions for designing an integrated circuit, the instructions comprising functionality for:
- obtaining a register-transfer level (RTL) file comprising a first plurality of state elements and a second plurality of state elements for the integrated circuit, wherein the RTL file comprises hardware description language code that describes a plurality of circuit modules for the integrated circuit, wherein the first plurality of state elements and the second plurality of state elements are circuit components configured to change states in response to a clock signal;
- obtaining, within the RTL file, a selection of the first plurality of state elements for a predetermined clock skew;
- associating, in response to obtaining the selection of the first plurality of state elements, the first plurality of state elements with a predetermined clock header;
- generating a gate-level netlist using the RTL file, wherein the first plurality of state elements are assigned to the predetermined clock header in the gate-level netlist, and wherein the second plurality of state elements are assigned to one or more random clock headers in the gate-level netlist using a netlist synthesis algorithm; and
- generating, using the gate-level netlist, a clock network for the integrated circuit, wherein the first plurality of state elements in the clock network have the predetermined clock skew.

16. The non-transitory computer readable medium of claim 15, wherein associating the first plurality of state elements with the predetermined clock header comprises assigning the first plurality of state elements to the predetermined clock header using user-defined attributes within the RTL file.

17. The non-transitory computer readable medium of claim 15,
wherein associating the first plurality of state elements with the predetermined clock header comprises assigning the first plurality of state elements to a predetermined group, and
wherein generating the gate-level netlist comprises generating the predetermined clock header in the gate-level netlist having each state element in the group connected to the predetermined clock header.

18. The non-transitory computer readable medium of claim 15, wherein the instructions further comprise functionality for:
generating a physical circuit layout file for the integrated circuit based on the gate-level netlist and the clock network,
wherein the physical circuit layout file comprises a plurality of locations on a semiconductor die for the first plurality of state elements, the second plurality of state elements, and the clock network.

19. The non-transitory computer readable medium of claim 15, wherein the instructions further comprise functionality for:
transmitting the physical circuit layout file to a user device, wherein the physical circuit layout file comprises mask data for fabricating the integrated circuit.

20. The non-transitory computer readable medium of claim 15,
wherein generating the clock network comprising generating a clock buffer in the clock network, and
wherein the first plurality of state elements are configured to receive a clock buffer signal from the predetermined clock header through the clock buffer.

* * * * *